(12) United States Patent
Herbig

(10) Patent No.: US 7,283,599 B1
(45) Date of Patent: Oct. 16, 2007

(54) PHASE ERROR DETECTOR FOR A QUADRATURE AMPLITUDE MODULATED (QAM) RECEIVER

(75) Inventor: Gerhard Herbig, Oppenweiler (DE)

(73) Assignee: Marconi Communications GmbH, Backnang (DE)

(*) Notice: Subject to any disclaimer, the term of this patent is extended or adjusted under 35 U.S.C. 154(b) by 568 days.

(21) Appl. No.: 10/018,759

(22) PCT Filed: Jun. 8, 2000

(86) PCT No.: PCT/IB00/00809

§ 371 (c)(1),
(2), (4) Date: Mar. 29, 2002

(87) PCT Pub. No.: WO00/79754

PCT Pub. Date: Dec. 28, 2000

(30) Foreign Application Priority Data

Jun. 19, 1999 (DE) ................................ 199 28 206

(51) Int. Cl.
*H04L 7/00* (2006.01)

(52) U.S. Cl. .................................................. 375/321

(58) Field of Classification Search ............... 375/261, 375/293, 298, 215, 226, 362, 371, 373, 375, 375/376; 327/2, 3, 147, 156, 163, 231, 233, 327/235, 236; 329/304, 307, 325; 370/503, 370/516; 702/72, 106; 713/503; 708/530

See application file for complete search history.

(56) References Cited

U.S. PATENT DOCUMENTS

| 4,811,363 | A |   | 3/1989 | Hoffmann |
|-----------|---|---|--------|----------|
| 4,958,360 | A | * | 9/1990 | Sari ............................ 375/344 |
| 5,042,052 | A | * | 8/1991 | Roberts et al. ............. 375/344 |
| 5,504,453 | A | * | 4/1996 | MacDonald et al. ........ 329/304 |
| 5,640,417 | A | * | 6/1997 | Barabash et al. ........... 375/222 |
| 5,872,812 | A | * | 2/1999 | Saito et al. ................. 375/261 |

FOREIGN PATENT DOCUMENTS

EP       0 571 788 A2    5/1993

OTHER PUBLICATIONS

Hoffmann, M. H. W., "*A New Carrier Regeneration Scheme for QAM Signals*", Proceedings of the International Symposium on Circuits and Systems, Jun. 7, 1988, pp. 599-602.

* cited by examiner

Primary Examiner—Khanh Tran
Assistant Examiner—Sam K. Ahn
(74) Attorney, Agent, or Firm—Kirschstein et al.

(57) ABSTRACT

The invention relates to a phase error detector which generates a phase correction signal in such a manner that the phase characteristic curve thereof does not have any undesired zero positions and comprises a finite steepness in the angular area around the engaging point. The inventive phase error detector (PFD) calculates the phase correction signal (S) according to the detected decision domain in accordance with a number of predetermined calculating methods. The phase error detector (PFD) attains such an allocation between the decision domains of the complex QAM single state plane and the individual calculating methods such that the static phase characteristic curve thereof does not have any additional zero positions apart from the engaging point.

2 Claims, 3 Drawing Sheets

PHASE ERROR DETECTOR FOR A QUADRATURE AMPLITUDE MODULATED (QAM) RECEIVER

PRIOR ART

The present invention concerns a phase error detector for a QAM receiver in which all QAM signal states that are present are stored and each of the QAM signal states lying in a complex signal state plane is surrounded by a decision region and the phase error detector detects, by threshold value decisions, in which decision region of a QAM signal state a complex received signal state broken down into its in-phase and quadrature-phase signal components falls and it forms a phase correction signal for the carrier phase of the received signal as a function of the detected decision region. Such a phase error detector is known from DE 36 19 744 A1.

Standard phase error detectors for QAM (quadrature-amplitude modulated) signals, which are also the point of departure in DE 36 19 744 A1, possess, in addition to the reference lock-in point at a phase error of $\phi=0$, additional undesired zeros in their phase characteristics, which can lead to lengthened synchronization times and to synchronization in unsuitable phases. For example, phase characteristics of such standard phase error detectors are shown in FIG. 4 for 16-QAM, 32-QAM, 64-QAM and 120-QAM, which have several undesired zeros, in addition to the one at the lock-in point $\phi=0$. An algorithm for a phase error detector is described in DE 36 19 744 A1, whose phase characteristic no longer has the interfering zeros. However, the method described in DE 36 19 744 A1 has properties that have proven disadvantageous in practical systems. The slope of the static phase characteristic is an important dimensioning parameter for the phase control loop of carrier recovery in a QAM receiver. The slope of the static phase characteristic at the lock-in point in the known method is heavily dependent on the signal-to-noise ratio of the received signal: it is small at a poor signal-to-noise ratio and tends toward infinity at a good signal-to-noise ratio. This strong variation of slope of the phase characteristic makes good dimensioning possible only with significant compromises. Moreover, all other standard phase error detectors based on the sign operations of the decision error, also possess this property.

Moreover, the static phase characteristics formed by known phase error detectors only make a statement concerning the average behavior of a phase error detector. During locking-in of a phase control loop, i.e., on transition from the lock-in phase to the followup phase, the average behavior does not play much of a role, but a uniformly good contribution of all QAM signal states does.

The underlying task of the invention is to offer a phase error detector of the type just mentioned that generates a phase correction signal in such a way that its phase characteristic has no undesired zeros.

ADVANTAGES OF THE INVENTION

The mentioned task is solved with the features of claim 1, in that several algorithms are available to the phase error detector for calculation of the phase correction signal. Which of the available algorithms is chosen for calculation of the phase correction signal depends on the decision region of the complex QAM signal state plane into which a received signal state broken down into its in-phase and its quadrature phase signal component falls. Five different algorithms for calculation of the phase correction signal are given in claim 1. Owing to the fact that the phase correction signal is not calculated according to the same algorithm for all decision regions, as in the prior art, but different algorithms are available, a phase characteristic can be implemented that no longer has undesired zeros, on the one hand, and guarantees uniform contribution of all QAM signal states, on the other hand. Which algorithm is the most suitable for which decision region can be determined empirically.

Advantageous modifications of the invention according to claim 1 are apparent from the subclaims.

DRAWING

The invention is further explained below with reference to a practical example depicted in the drawing. In the drawing.

DESCRIPTION OF A PRACTICAL EXAMPLE

Figure 1:
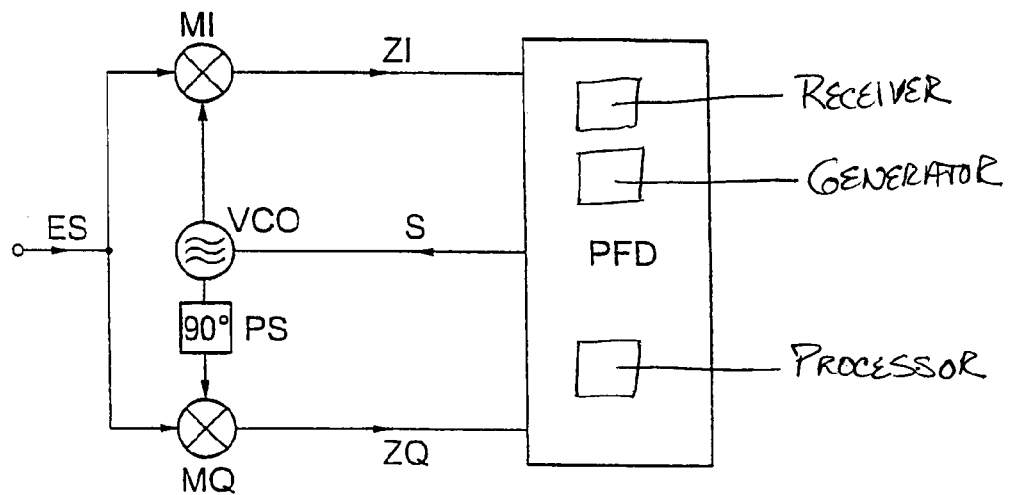
FIG. 1 shows a block diagram of a QAM receiver.

A block circuit diagram of a QAM receiver is shown in FIG. 1. The QAM receiver consists of an in-phase signal branch and a quadrature-phase signal branch. A mixer MI is situated in the in-phase signal branch and a mixer MQ in the quadrature-phase signal branch. These two mixers MI and MQ convert the received signal ES, which is divided on both signal branches, into the base band. The reference frequency for the two mixers MI and MQ is delivered by a voltage-controlled oscillator VCO. The reference frequency signal generated by this voltage-controlled oscillator is fed from one of the two mixers to a 90° phase shifter PS, so that the reference frequencies of the two mixers MI and MQ have a mutual phase offset of 90°. The output signal of mixer MI, which represents the in-phase signal component ZI of a received signal state, and the output signal of mixer MQ, which represents the quadrature-phase signal component ZQ of a received signal state, are fed to a phase error detector PFD. This phase error detector PFD, as described in detail below, includes a signal receiver, a signal generator, and a processor which processes the algorithms described below, generates a phase correction signal S that serves as control signal for the voltage-controlled oscillator VCO.

The following equations will clarify how the phase error detector determines, from the individual received signal state with the in-phase signal component ZI and the quadrature-phase signal component ZQ, the phase correction signal S that represents the offset of the carrier phase of the received signal relative to the phase of the reference frequency signal generated by the voltage-controlled oscillator VCO. The phase error detector PFD calculates the phase correction signal S according to a widely known method according to equation (1).

$$S = FQ\,ZI - FI\,ZQ \tag{1}$$

FI and FQ are the decision errors, which, as expressed in equation (2), are the offsets of the in-phase signal component ZI and the quadrature-phase signal component ZQ of the received signal state relative to the in-phase component AI and the quadrature-phase component AQ of the QAM signal state for which the phase error detector PFD decided that this is the transmitted signal state emitted by a transmitter.

$$FI=ZI-AI$$

$$FQ=ZQ-AQ \tag{2}$$

During transmission of the transmitted signal state without distortion, the received signal state $Z=ZI+jZQ$ is only rotated by an angle $\phi$ relative to the transmitted signal state $A=AI+jAQ$. This is expressed by equation (3).

$$Z=Ae^{j\phi}=(AI+jAQ)(\cos\phi+j\sin\phi) \tag{3}$$

The function shown in equation (1) is not often used to calculate the phase correction signal, but rather the sign version according to equation (4), which requires no demanding multiplication.

$$S=FQ\ \text{sign}(ZI)-FI\ \text{sign}(ZA) \tag{4}$$

The static phase characteristic is the average of all possible QAM transmitted signal states, as shown in equation (5).

$$S(\phi)=E(FQ\ \text{sign}(Zf)-FI\ \text{sign}(ZQ)) \tag{5}$$

Because of equation (2), the following applies to the quadrature component of the decision error:

$$FI=AI\cos\phi-AO\sin\phi-AI$$

$$FO=AQ\cos\phi-AI\sin\phi-AO \tag{6}$$

With (6), the following applies for the phase correction signal S according to (1).

$$S=(AQ\cos\phi+AI\sin\phi-AQ)(AI\cos\phi-AQ\sin\phi)-$$

$$(AI\cos\phi \cdot AQ\sin\phi-AI)(AQ\cos\phi+AI\sin\phi) \tag{7}$$

With this phase correction signal with $E(A^2)=1$, a static phase characteristic line is obtained according to equation (8).

$$S(\phi)=-\cos\sin\phi+\sin\phi\cos\phi-\sin\phi-\cos\phi\sin\phi-\sin\phi$$
$$\cos\phi-\sin\phi=2\sin\phi \tag{8}$$

This calculation of the static phase characteristic, however, presumes validity of equation (2), i.e., an error-free coordination of the received signal state to the transmitted signal state. For QAM signal constellations, this means a restricted validity range dependent on the modulation method of the phase characteristic according to equation (8), for example [−45°, +45°] for 4-QAM, [−16.50, +16.5°] for 16-QAM, etc.

Figure 4:
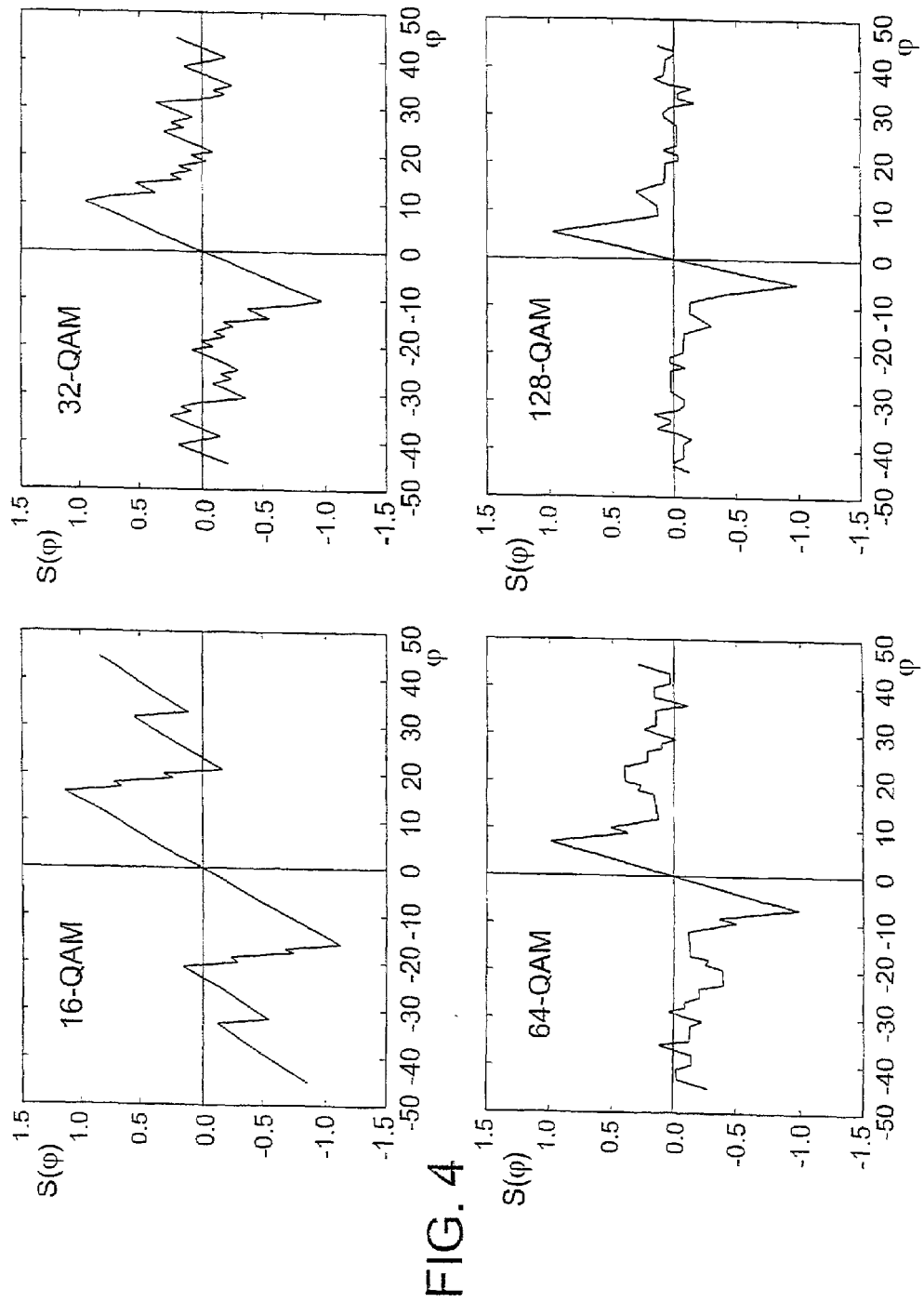

Phase characteristics according to the sign version according to equation (4) do not have a sinusoidal trend in the validity region, but a linear trend. Phase characteristics for 16-QAM, 32-QAM, 64-QAM and 128-QAM receivers are shown in FIG. 4, which calculate the phase correction signal in the standard method according to equation (5). In all four modulation methods, undesired zeros, i.e., false lock-in points, are present; they are most clearly apparent in 32-QAM. In this modulation method, the longest residence times in the undesired phase positions are also found.

In order to avoid undesired zero transitions in the phase characteristic, five different calculation methods for the phase correction signal are available to the phase error detector:

$$S1=FQ\ f(ZI)-FI\ f(ZQ)$$

$$S2=\pm 2\ FQ\ f(ZI)$$

$$S3=\pm 2\ FI\ f(ZQ) \tag{9}$$

$$S4=\pm 2\ ZI\ ZQ$$

$$S5=0$$

In the four calculation methods S1 to S4, the following applies for the functions f(ZI) and f(ZQ):

$$f(ZI)=ZI \text{ and } f(ZQ)=ZQ$$

or $$f(ZI)=\text{sign}(ZI) \text{ and } f(ZQ)=\text{sign}(ZQ)$$

Which one the five calculation methods S1 to S5 is used for the phase correction signal of the phase error detector depends on the decision region of a QAM signal state in which a complex received signal state broken down into its in-phase signal component ZI and its quadrature-phase signal component ZQ falls.

In allocating the calculation methods S1 to S5 to the individual decision regions, the fractions of all transmitted symbols are considered individually on the static phase characteristic. Thus, for example, there are precisely 16 different transmission symbols A(i), i=1 ... 16 and therefore 16 fractions S(i) in 16-QAM modulation, which on average then form the static phase characteristic S:

$$S=\frac{1}{16}\sum_{(0)}^{16}S(i) \tag{10}$$

In order to obtain a favorable trend for the phase characteristic S, the transmission symbols A(i) that possess a negative range S(i)<0 for positive angles $\phi$>0 or a positive range for a negative value are identified in the first step. In this case, the method S1, i.e., the standard method, is initially presumed for all decision regions. These regions then lead in equation (10) to the undesired zeros in the overall behavior of the phase correction characteristic S. In the second step, the decision regions that yield the undesired correction information in the corresponding transmission symbol A(i) are then determined. In the third step, it can be tested whether one of the methods S2 or S3 brings a desired improvement. After processing of all transmission symbols and all decision regions, an improvement of the trend of the phase characteristic is generally established. However, it can happen that the improvement is still not sufficient. For the remaining regions S(i)<0 for $\phi$>0, or S(i)>0 for $\phi$<0, the methods S4 and S5 are then used, but in which only as many decision regions are chosen until the desired zeros have reliably disappeared in the phase characteristics. Methods S4 and S5 are therefore used with restraint, because they cause a deformation (although a slight one) of the static phase characteristic at the lock-in point. The method described here is expediently performed with computer support, but in which some decisions must be made empirically.

Figure 2:
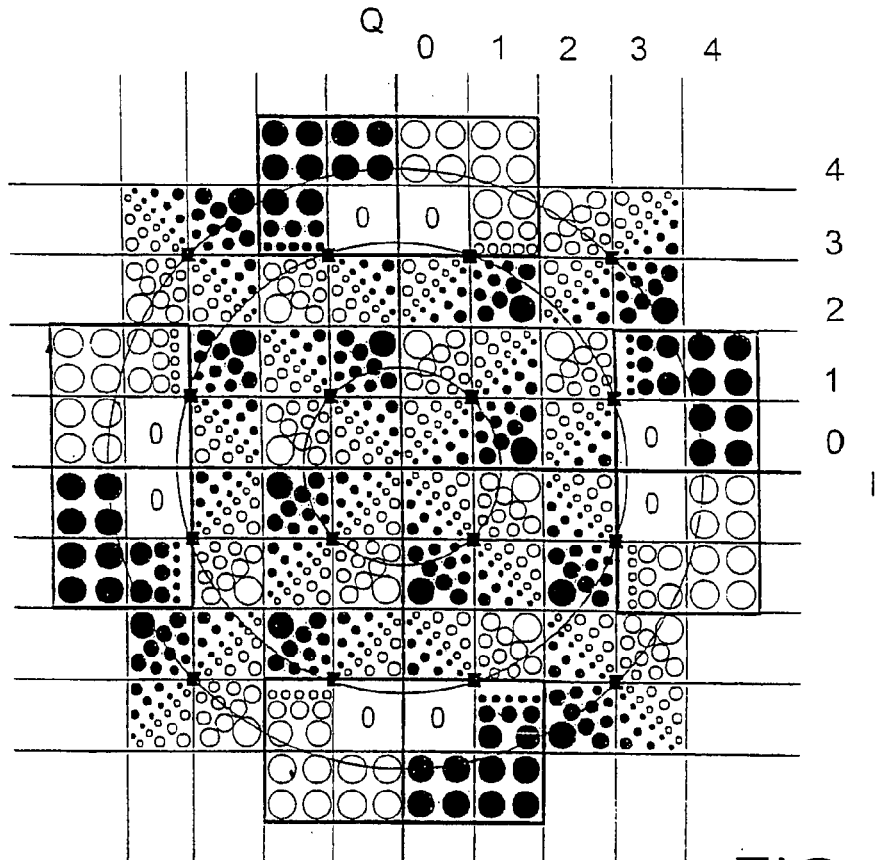
FIG. 2 shows a complex QAM signal state plane.

The complex signal state plane of a 16-QAM system is shown in FIG. 2 as an example. The indices I of the in-phase signal component run from 0 to 4 on the abscissa of the coordinate system of the complex QAM signal state plane and the indices Q of the quadrature-phase signal components also run from 0 to 4 on the ordinate of the coordinate system. The 16 square points in the signal state plane correspond to the 16 QAM transmitted signal states, and the three thin concentric circles on which the square points lie are the tracks of the received signal states with deficient carrier phase synchronization. The squares that enclose the signal states (square points) are referred to as decision regions. The phase error detector PFD determines, by threshold value decision, in which decision region of a certain QAM signal state a complex received signal state broken down into its in-phase signal component ZI and its quadrature-signal component ZQ falls. The direction and strength of the phase correction information calculated by the phase error detector are shown by the color (black, white) and size of the circles drawn in FIG. 2. Black circles produce a phase correction in the positive direction (counterclockwise) and white circles in the negative direction (clockwise). Large circles correspond to a strong correction, small circles to a weak correction. In the eight fields marked 0, no correction information at all is generated (corresponds to method S5).

The thickly bordered decision regions in FIG. 2 experience a modification relative to the known standardized phase error detection. Different calculation methods according to equation (9) are used for them for the phase correction signal. The indices I and Q, which describe the position of the decision region, are shown in the following table in the section 16-QAM. In addition, for each decision region, i.e., for each combination I/Q, the calculation method selected from the five calculation methods S1 to S5 is performed. For example, for the decision regions 0/3 and 3/0, the value 0 is required there, which corresponds to method S5. In regions 0/4, 1/4, 4/0 and 4/1, the correction information is constant; this correspond to calculation method S4. In the two decision regions 1/3 and 3/1, the phase correction information is only dependent on a decision error FI or FQ, which is expressed in FIG. 2 by orientation of the point size parallel to the axis; calculation methods S2 and S3 come into play here.

Why the choice just described of different calculation methods S1 to S5 leads to an improvement for the phase correction signal of static phase characteristics with undesired zeros can be explained as follows:

The four outer decision regions 0/4, 1/4, 4/0 and 4/1 are clearly in the phase correction information. It therefore makes sense to choose for these cases the maximum value established by the control region. However, not all decision regions whose correction information is clear may be treated in this manner, because the trend of the static phase characteristic should to be distorted as little as possible in the vicinity of the origin (finite slope of the phase characteristic at the lock-in point φ=0). For this reason, for example, the regions 0/1 and 1/0 are unchanged.

The regions 0/3 and 3/0 yield false correction information for the specific phases, because a high uncertainty exists on the average circle with reference to the actually transmitted signal state. Filtering out these decision regions is essential and accordingly these regions are marked with a zero in FIG. 2 for which calculation method S5 is considered.

The two regions 1/3 and 3/1 are encountered either in the lock-in phase of a rotating corner point or in the follow-up of an adjacent noise-affected received signal state. In the first case, these decision regions furnish correct phase correction information and in the second case, insignificant information. In order for these decision regions to yield the highest possible phase correction information in the first case and the least possible phase correction information in the second case, only one quadrature component FI or FQ of the decision error is evaluated according to the calculation method S2 or S3.

The following tables can also give the decision regions for the individual calculation methods S1 to S5 for 32-QAM, 64-QAM and 128-QAM systems.

16-QAM

| Index I | Index Q | Method |
|---|---|---|
| 3 | 0 | S5 |
| 0 | 3 | S5 |
| 3 | 1 | S3 |
| 1 | 3 | S2 |
| 4 | 0 | S4 |
| 0 | 4 | S4 |
| 4 | 1 | S4 |
| 1 | 4 | S4 |
| All others | All others | S1 |

32-QAM

| Index I | Index Q | Method |
|---|---|---|
| 3 | 0 | S5 |
| 0 | 3 | S5 |
| 4 | 0 | S3 |
| 0 | 4 | S2 |
| 4 | 2 | S3 |
| 2 | 4 | S2 |
| 5 | 1 | S3 |
| 1 | 5 | S2 |
| 5 | 2 | S4 |
| 2 | 5 | S4 |
| All others | All others | S1 |

64-QAM

| Index I | Index Q | Method |
|---|---|---|
| 3 | 0 | S5 |
| 0 | 3 | S5 |
| 4 | 0 | S3 |
| 0 | 4 | S2 |
| 4 | 2 | S3 |
| 2 | 4 | S2 |
| 5 | 1 | S3 |
| 1 | 5 | S2 |
| 5 | 2 | S4 |
| 2 | 5 | S4 |
| 7 | 3 | S3 |
| 3 | 7 | S2 |
| 8 | 2, 3, 4, 5 | S4 |
| 2, 3, 4, 5 | 8 | S4 |
| 9 | 0, 1, 2, 3, 4 | S4 |
| 0, 1, 2, 3, 4 | 9 | S4 |
| All others | All others | S1 |

128-QAM

| Index I | Index Q | Method |
|---|---|---|
| 3 | 0 | S5 |
| 0 | 3 | S5 |
| 4 | 0 | S3 |
| 0 | 4 | S2 |
| 4 | 2 | S3 |
| 2 | 4 | S2 |
| 5 | 1 | S3 |
| 1 | 5 | S2 |
| 5 | 2 | S4 |
| 2 | 5 | S4 |

-continued

| 128-QAM | | |
|---|---|---|
| Index I | Index Q | Method |
| 7 | 3 | S3 |
| 3 | 7 | S2 |
| 8 | 5 | S5 |
| 5 | 8 | S5 |
| 9 | 3 | S3 |
| 3 | 9 | S2 |
| 9 | 7 | S5 |
| 7 | 9 | S5 |
| 9 | 8 | S5 |
| 8 | 9 | S5 |
| 10 | 2 | S5 |
| 2 | 10 | S5 |
| 10 | 7 | S5 |
| 7 | 10 | S5 |
| 10 | 8 | S5 |
| 8 | 10 | S5 |
| 11 | 5 | S3 |
| 5 | 11 | S2 |
| 11 | 6 | S4 |
| 6 | 11 | S4 |
| 12 | 3 | S4 |
| 3 | 12 | S4 |
| 12 | 4 | S4 |
| 4 | 12 | S4 |
| All others | All others | 1 |

Figure 3:
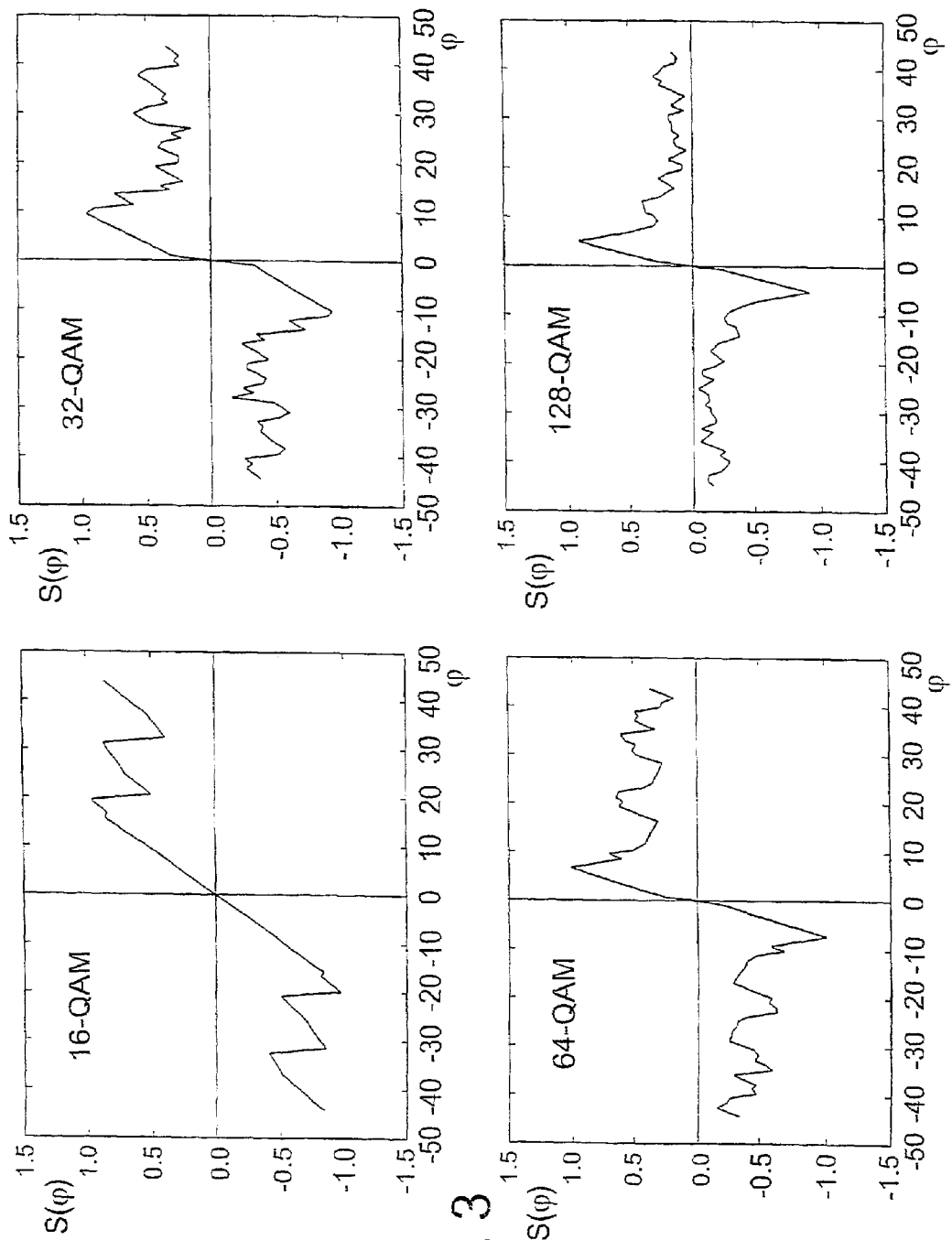
FIG. 3 shows several phase characteristics of phase detectors designed according to the invention and FIG. 4 shows several phase characteristics of standard phase error detectors.

With the depicted allocations of the different calculation methods S11 to S5 for the phase correction signal, we obtain for the 6-QAM, 32-QAM, 64-QAM and 128-QAM systems the phase characteristics shown in FIG. 3, which have an unaltered trend at the lock-in point $\phi=0$ and no undesired zeros.

I claim:

1. A phase error detector for generating a phase correction signal to correct a phase difference between a reference frequency of a voltage-controlled oscillator and a carrier frequency of a received signal which is received by a quadrature-amplitude modulated (QAM) receiver, the phase correction signal having a zero-crossing locking point, the received signal having in-phase components and quadrature components in a plurality of decision regions, the phase error detector comprising a signal receiver, a signal generator, and a processor for processing a plurality of different algorithms; and the phase error detector being operative for successively executing the algorithms in an order, for each of the plurality of decision regions, until the phase correction signal having no additional zero-crossing locking points is generated, wherein the plurality of different algorithms being stored in the phase error detector, and being arranged in the order as below:

$$S1 = FQ\, f(ZI) - FI\, f(ZO)$$

$$S2 = \pm 2\, FO\, f(ZI)$$

$$S3 = \pm 2\, FI\, f(ZO)$$

$$S4 = \pm 2\, ZI\, ZO$$

$$S5 = 0$$

in which S1, S2, S3, S4, S5 are different phase correction signals, in which ZI and ZO are the in-phase and quadrature components of the received signal, in which FI and FO are offsets of ZI and ZQ, in which f(ZI)=ZI or sign (ZI), and f(ZO)=ZO or sign (ZO).

2. The phase error detector of claim 1, wherein the phase error detector is operative for executing different ones of the plurality of algorithms for all of the plurality of decision regions.

* * * * *

UNITED STATES PATENT AND TRADEMARK OFFICE
CERTIFICATE OF CORRECTION

PATENT NO. : 7,283,599 B1
APPLICATION NO. : 10/018759
DATED : October 16, 2007
INVENTOR(S) : Herbig It is certified that error appears in the above-identified patent and that said Letters Patent is hereby corrected as shown below:

In Column 2, Line 21, delete "invention" and insert -- invention, --, therefor.

In Column 3, Lines 38-39, in Equation (8), delete

" $S(\phi) = -\cos\phi \sin\phi + \sin\phi \cos\phi - \sin\phi - \cos\phi \sin\phi - \sin\phi \cos\phi - \sin\phi = 2 \sin\phi$ " and insert -- $S(\varphi) = -\cos\varphi \sin\varphi + \sin\varphi \cos\varphi - \sin\varphi - \cos\varphi \sin\varphi - \sin\varphi \cos\varphi - \sin\varphi = 2 \sin\varphi$ --, therefor.

In Column 3, Line 47, delete "[-16.50," and insert -- [-16.5°, --, therefor.

In Column 7, Line 31, delete "S11" and insert -- S1 --, therefor.

In Column 8, Line 18, in Claim 1, delete "f(ZO)" and insert -- f(ZQ) --, therefor.

In Column 8, Line 20, in Claim 1, delete "FO" and insert -- FQ --, therefor.

In Column 8, Line 22, in Claim 1, delete "f(ZO)" and insert -- f(ZQ) --, therefor.

In Column 8, Line 24, in Claim 1, delete "ZO" and insert -- ZQ --, therefor.

In Column 8, Line 29, in Claim 1, delete "ZO" and insert -- ZQ --, therefor.

In Column 8, Line 30, in Claim 1, delete "FO" and insert -- FQ --, therefor.

UNITED STATES PATENT AND TRADEMARK OFFICE
CERTIFICATE OF CORRECTION

PATENT NO.       : 7,283,599 B1
APPLICATION NO.  : 10/018759
DATED            : October 16, 2007
INVENTOR(S)      : Herbig It is certified that error appears in the above-identified patent and that said Letters Patent is hereby corrected as shown below:

In Column 8, Line 32, in Claim 1, delete "f(ZO)=(ZO) or sign (ZO)." and insert -- f(ZQ)=(ZQ) or sign (ZQ). --, therefor.

Signed and Sealed this

Tenth Day of February, 2009

JOHN DOLL
*Acting Director of the United States Patent and Trademark Office*